Nov. 28, 1967 G. H. SCHLICHTING 3,355,066

MARKING AND CARRYING CONTAINER FOR DATA PROCESSING CARDS

Filed March 9, 1966 2 Sheets-Sheet 1

INVENTOR.

GILBERT H. SCHLICHTING

BY Jacobi & Davidson

ATTORNEYS.

Nov. 28, 1967 G. H. SCHLICHTING 3,355,066

MARKING AND CARRYING CONTAINER FOR DATA PROCESSING CARDS

Filed March 9, 1966 2 Sheets-Sheet 2

INVENTOR.
GILBERT H. SCHLICHTING

BY Jacobi & Davidson
ATTORNEYS.

United States Patent Office 3,355,066
Patented Nov. 28, 1967

3,355,066
MARKING AND CARRYING CONTAINER FOR DATA PROCESSING CARDS

Gilbert H. Schlichting, 1180 Vance Way, Sparks, Nev. 89431

Filed Mar. 9, 1966, Ser. No. 532,951
12 Claims. (Cl. 221—259)

ABSTRACT OF THE DISCLOSURE

A container for carrying data processing cards and for permitting marking of such cards, said container including an array of discrete marking apertures formed in the top wall thereof and an opening formed in the bottom wall thereof aligned beneath said array. The operator can insert his finger through the bottom opening to push a stack of cards within the container upwardly so that the uppermost card in the stack can be marked by a marking instrument inserted through the appropriate marking aperture.

This invention relates generally to containers, and in particular, it relates to a new and improved container for carrying data processing cards and for permitting marking of such cards as the same are being carried.

While the present invention finds utility in many different fields, and indeed can be utilized in any application where information is to be recorded on data processing cards, the invention is particularly directed to a unit which can be used by employees of a public utility for reading meters, such as gas meters or electric meters. As is well known, such employees who act as meter readers, go from house to house, or from location to location, reading and recording the information which is registered on a customer's meter. In the past, it has been customary to record such information in a book, and thereafter, such information is transcribed from the book to calculate the total weekly, monthly or other periodic billing charge due from a customer.

In recent years, however, most large facilities such as public utiliy companies have resorted to the use of data processing equipment for calculating and determining the monthly billing to each customer. Thus, in following such a procedure, it became necessary to collect the information from each meter reader's book and to transcribe the same onto data processing cards which could thereafter be utilized in the automatic data processing equipment. It will, of course, be apparent that it was a costly and time consuming procedure to first have the meter man collect the information and transcribe the same in his book, and to thereafter have the same or another employee take the information from the book and transfer the same to the data processing cards. Accordingly, it apears to be desirable and beneficial to provide a means whereby a meter reader can record his information directly upon the data processing cards, so that such cards can thereafter immediately be supplied to the data processing equipment, without the need for any intermediate steps by additional employees.

There have in the past been certain proposals in the prior art directed toward a solution of this type, wherein the meter reader automatically transcribes his billing information upon data processing cards, but for the most part, these prior art proposals have been unsatisfactory and commercially unacceptable. For example, one prior art approach involved a complicated container having means for automatically punching the information into a data processing card. Such an arrangement included electric light means for shining beams of light through the punched holes in the cards, and necessarily also included a power supply for the light source. Additionally, it was a difficult and cumbersome job, requiring intricate manipulation for the meter reader to carefully punch the proper markings into an individual card. As a result, the unit of this type was not only heavy to carry and difficult to handle, but it took a meter man considerably more time to use this arrangement than it did in the past when he merely marked the informaiton in a book. Other prior art approaches along this line were equally unsatisfactory, and even though such approaches did have the ultimate result of having the billing information directly transcribed upon a data processing card, there was so much additional time and effort involved in applying such information to the data processing cards, that any overall economic savings to the company itself was virtually eliminated.

With the foregoing in mind, it is, therefore, an object of the present invention to overcome the difficulties and deficiencies associated with the prior art, and to provide a means whereby the user can easily and quickly apply information directly to a series of data processing cards.

Another object of the present invention is to provide a new and improved container which permits data processing cards to be carried and to be marked in a simple and efficient manner, while being carried.

Another object of the present invention is to provide a container for data processing cards which can be body-carried by a person, and wherein such person can accurately and easily mark the desired information upon a card without first removing the same from the container.

Further objects of the present invention include the provision of a container for carrying data processing cards, which container: (1) contains a minimum amount of moving parts; (2) incorporates simple guide means for assuring accurate recordation of the information upon the cards; (3) includes stabilizing means for facilitating marking of the cards; (4) properly protects the cards from bending, tearing, or otherwise being mutilated or adversely affected by the weather; (5) insures that the cards, after the same have once been marked, will remain in proper order and will not inadvertently fall therefrom; (6) permits the user to readily remove therefrom and reinsert thereinto, a card which has been marked; (7) can be readily supported by the user's body, thereby permitting him free use of his hands; (8) permits a full view of all cards therewithin; (9) is of light-weight construction to facilitate carrying thereof; and (10) can be efficiently and inexpensively produced, yet which is durable in construction.

Other objects, advantages and salient features of the present invention will become apparent from the following detailed description, which, taken in conjunction with the annexed drawings, discloses a preferred embodiment thereof.

Referring to the drawings.

Figures 1, 2, 3, 5:
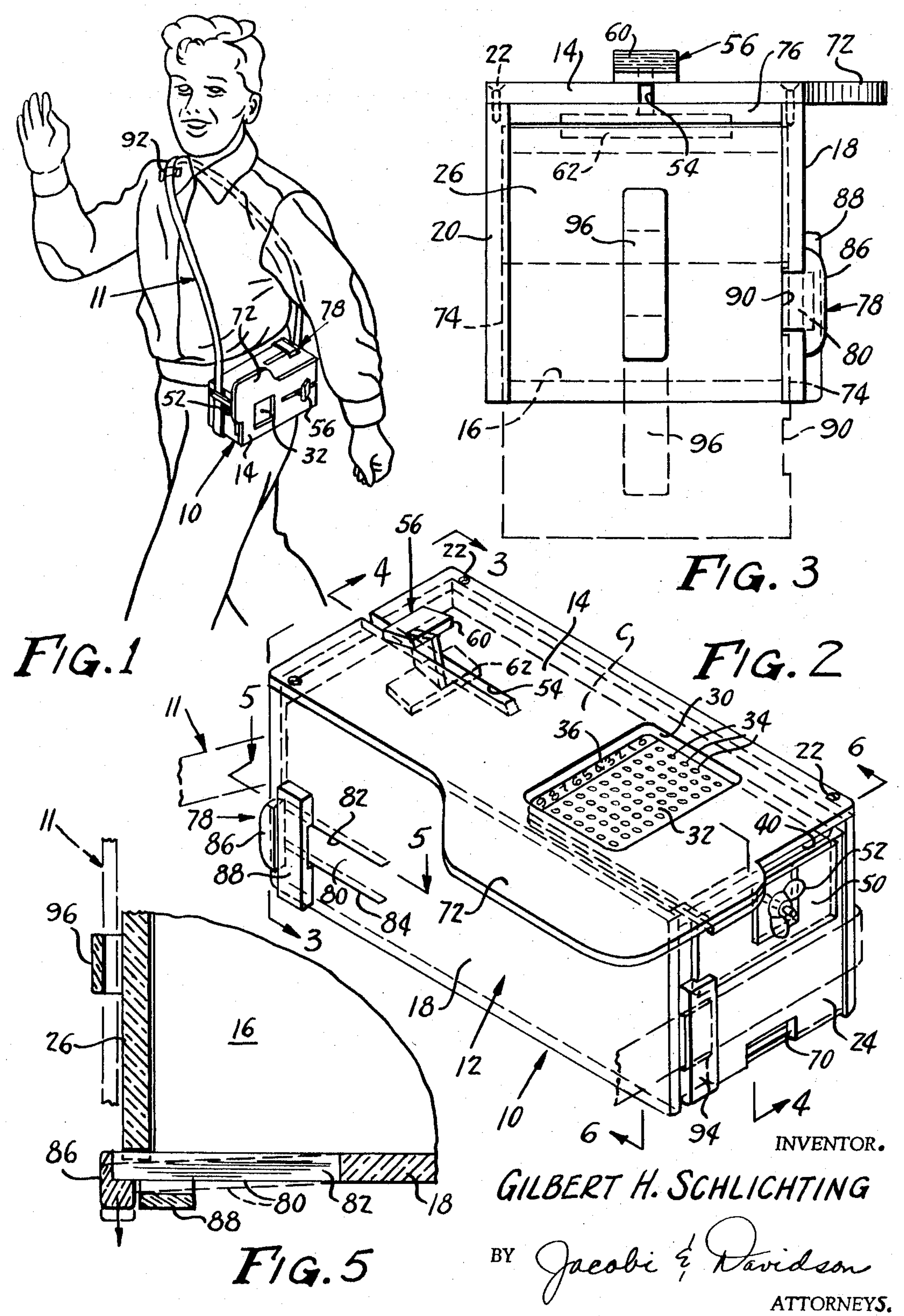
FIGURE 1 is a perspective view of the container of the present invention, as the same is body-carried by a user.
FIGURE 2 is an enlarged perspective view thereof.
FIGURE 3 is an end view thereof, looking in the direction of the arrows 3—3 of FIGURE 2.
FIGURE 5 is a fragmentary sectional view taken substantially along the line 5—5 of FIGURE 2; and, FIGURE 6 is an end view thereof looking in the direction of the arrows 6—6 of FIGURE 2.

In general, the invention can be considered as including a container means generally designated 10 and an elongated loop strap generally designated 11, such strap being coupled to the container means 10 and being adapted to be slung over a user's shoulder in the manner shown in FIGURE 1.

The container means 10 includes a casing generally designated 12, which casing is preferably fabricated of an optically transparent material, preferably a synthetic resinous material. If the casing 12 is so fabricated, it permits visual observation of the data processing cards, which are disposed therewithin.

The casing 12 includes a top wall 14, a bottom wall 16 spaced therebeneath, and a pair of spaced parallel side walls 18 and 20 disposed in spaced parallel relationship to one another. The side walls are coupled to the top and bottom walls by some suitable attachment means, such as adhesive, but if desired, attaching screws 22 can be utilized.

Figure 4:
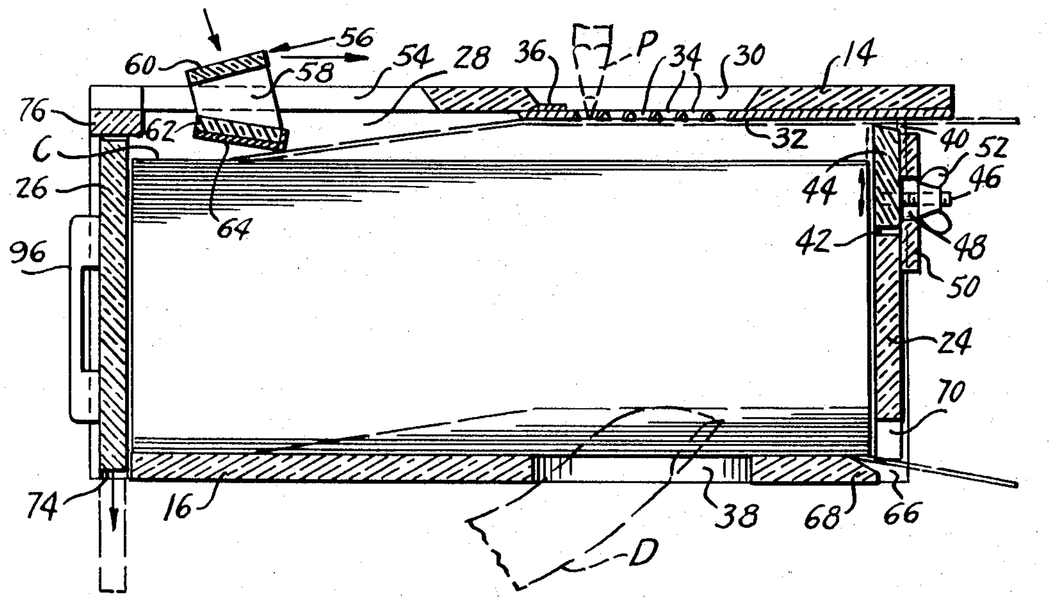
FIGURE 4 is a sectional view thereof taken substantially along the line 4—4 of FIGURE 2.

The casing 12 also includes a forward end wall 24 and a rear end wall or butt plate 26. The overall effect of the top and bottom walls, side walls and end walls, as connected togther, is to form an internal cavity 28 within the casing, as can best be seen in FIGURE 4. This internal cavity 28 is adapted to contain a stack of data processing cards, identified as C.

Considering the top wall 14 in greater detail, it will be seen that the same has an opening or aperture 30 therein at the end thereof nearest the front end wall 24. A plate 32 is affixed to the undersurface of the top wall 14 and extends across this opening 30. In that portion of the plate extending beneath the opening 30, a plurality of frusto-conical marking apertures 34 are provided. These marking apertures 34 are arranged as an array of discreet holes aligned in appropriate columns to coincide with the marking columns appearing on the data processing cards. An indicia plate 36 can be attached to the upper surface of the plate 32 at one edge of the opening 30, with such indicia plate carrying markings "0, 1, 2 . . . 9." Each marking is arranged in alignment with a column of marking apertures 34, as can best be seen in FIGURE 1. Thus, again referring to FIGURE 4, when a marking pencil P is inserted into the appropriate marking aperture 34, it can then place a mark in the appropriate column on the uppermost card C in the stack thereof contained within the internal cavity 28 in the casing 12.

In order to properly mark the cards C within the stack thereof, an opening 38 is provided in the bottom wall 16, such opening 38 being aligned beneath the opening 30 in the top wall and hence beneath the array of marking apertures 34. The opening 38 permits a user to insert a digit D therethrough to push against the bottom of the stack of cards and to raise the same upwardly until the uppermost card C in the stack thereof is in contact with the underside of the plate 32. When the stack is raised in this manner, the marking instrument or pencil P can easily mark the appropriate columns on the card.

After the uppermost card in the stack thereof has been marked, it is necessary to dispense the same from the container and to then reinsert the same into the container at the bottom of the stack of cards within the internal cavity 28. To this end, a first slot means 40 is provided at the upper end of the front end wall 24. To properly adjust the size of this slot means 40 to assure that only a single card can be dispensed therethrough, a central recess 42 is provided in the front wall 24 and an adjustable control element 44 is disposed within said recess. A threaded stem 46 extends outwardly from the control element and through an elongated slot 48 in an auxiliary plate 50 affixed to the front of the end wall 24. A wing nut 52 threads onto the shaft 46 and abuts against the plate 50 to thus adjust the position of the control element 44. It must be realized that, due to manufacturing tolerances, all data processing cards are not of exactly the same thickness, and moreover, the thickness of such cards varies slightly due to the ambient weather conditions. Accordingly, each time a stack of cards is inserted into the casing 12, the control element 44 should be properly adjusted by loosening the wing nut 52 and by either raising or lowering the control element until only a single card C will fit through the slot means 40. Then, the wing nut 52 can be tightened, thereby maintaining the control element 44 in its adjusted position.

In order to dispense a marked card from the top of the stack thereof through the slot means 40, an ejector means must be provided, and such ejector means includes an elongated central passage means 54 extending from the rear of the top face 14 but terminating short of the opening 30 therein, and also includes a slide member generally designated 56 movably mounted within the passage 54. The slide member 56 includes a vertical portion 58 having a thickness which adapts the same to fit within the slot 54 and to slide therewithin, a top finger engageable plate 60 at the upper end of the portion 58 and a lower plate 62 at the bottom thereof. The bottom plate 62 forms a portion of the slide member which is disposed within the intrnal cavity 28 and as such, is provided with a frictional engaging means 64 on the lower surface thereof which is adapted to engage a card C. The frictional engaging means can be an abrasive material attached to the plate 62 or can be be a series of sharp or roughened protuberances extending from the plate 62.

The nature of the slide member 56 is such that the same is somewhat loosely disposed within the passage 54. Thus, unless a finger or digit D is inserted through the bottom opening 38 to raise the stack of cards upwardly, movement of the slide member 56 would serve no purpose except to bow or arch the uppermost card in the stack. In no event, would such movement cause the card to be inadverently dispensed through the slot means 40. However, when the stack is raised by insertion of a digit, in the manner shown in FIGURE 4, then the pressure of a finger applied to the plate 60 and pushed forwardly, in the manner shown by the arrows in FIGURE 4, causes the frictional engaging means 64 to contact the uppermost card in the stack thereof and to dispense the same through the slot means 40.

Once a marked card has been dispensed through the slot means 40, it is desired to place the same on the bottom of the stack within the internal cavity 28, and to this end, a second slot means 66 is provided at the lower end of the front end wall 24. This second slot means 66 can be formed by terminating the bottom wall 16 somewhat short of contact with the front end wall 24, as can best be seen in FIGURE 4, and additionally, if desired, a suitable taper 68 may be provided at the forward end of the bottom wall 16 to thereby facilitate insertion of a card. Moreover, an enlarged central recess portion 70 may be provided at the lower end of the end wall 24 to permit digital insertion of a card completely through the slot means 70 and fully into the internal cavity 28 at the bottom of the stack of cards disposed therewithin.

An important feature of the present invention resides in the provision of a projecting portion 72 extending integrally from the front corner of the top wall 14 and beyond one side wall 18. Additionally, such projecting portion 72 can extend slightly beyond the front end wall 24, as can best be seen in FIGURE 2. The purpose of the projecting portion 72 is to provide a hand rest for stabilizing the operator's hand during a marking operation. That is, the operator can rest his hand on the projecting portion 72 during a marking operation when the marking instrument P is inserted through one of the marking apertures 34 to mark the uppermost card C. In this manner, the marking operation is simplified and facilitated, and greater accuracy of marking is obtained.

To insert a new stack of marking cards into the internal cavity 28, or alternatively to remove a marked stack of cards therefrom, some access means must be provided, and in the present invention, this access means takes the form of a removable butt plate or rear end wall 26. The side edges of the rear end wall 26 fit within opposed grooves 74 formed on the interior of the side walls 18 and 20 at the rear end thereof. Thus, the butt plate 26 can slide within these grooves 74 until the top end thereof contacts a top bar 76 extending across the rear of the casing 12. This bar 76 also serves to limit rearward movement of the ejector slide member 56. To prevent the butt plate 26 from inadvertently sliding out of the grooves 74, a latch means generally designated 78 is provided, and the nature of such latch means will best be understood by reference to FIGURES 2, 3 and 5. A latch bar 80 is formed by providing a pair of spaced slits or cuts 82 and 84 in the side wall 18, such cuts extending from the rear edge thereof in a forward direction. A handle 86 is attached to the rear end of the latch bar 80, preferably by adhesive means. Thus, the latch bar 80 forms a resilient finger, which, although integral with the side wall 18, can be moved upwardly by the application of pressure to the handle 86, as indicated by the arrow in FIGURE 5. A generally C-shaped stop member 88 is attached to the side wall 18 above and below the slits 82 and 84. Thus, the central portion of the stop member acts as a limiting abutment surface to terminate outward movement of the latch bar 80. This can best be understood by reference to FIGURE 5. A notch 90 is formed in one edge of the butt plate 26, as shown in FIGURE 3, and such notch is positioned at a level whereat the latch bar 80 normally fits thereinto. So long as the latch bar 80 rests within the notch 90, the butt place 26 is prevented from sliding in the grooves 74. However, when it is desired to remove the butt plate 26, for loading or unloading of a stack of cards, outward pressure can be applied to the handle 86, thereby moving the latch bar outwardly until the same contacts the clamp 88. Such outward movement removes the latch bar 80 from the notch 90 and permits the butt plate 26 to be slid downwardly through the grooves 74 for removal. When the butt plate is again reinserted into the grooves 74 and pushed upwardly, the latch bar 80 will snap back into the notch 90, thereby again locking the butt plate in position.

Figure 6:
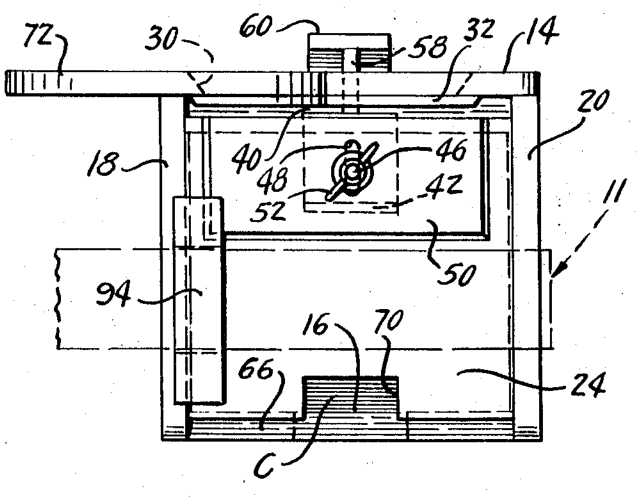

As aforesaid, the unit 10 is adapted to be body-carried by means of an elongated strap 11. An adjustable buckle 92 can be provided to vary the size of the loop 11, so that the same will fit any size user. Strap supporting means are provided on the casing 12 for coupling the strap 11 thereto, with such strap supporting means taking the form of a generally C-shaped clamp 94 affixed to the front end wall 24 and another generally C-shaped clamp 96 affixed to the rear end wall or butt plate 26. The strap 11 fits through these clamps 94 and 96 and extends along the side walls 20, as shown in FIGURE 6, to thereby support the casing 12 by the strap 11.

With the foregoing in mind, the operation of the device of the present invention should be apparent. The butt plate 26 is removed each morning to load the internal cavity 28 with a stack of cards C, preferably 500 in number. Then, the butt plate is reinserted into position wherein remains locked by means of the latch means 78. Preferably, the stack of cards will be arranged in the order of the meter reader's route so that the cards representing the first location will be uppermost in the stack, the card for the next location will be second in the stack, and so on. The user then adjusts the control element 44 to vary the size of the slot means 40 until the same will dispense only a single card C. Then, the user places the strap 11 over his shoulder and proceeds over his route. At each location, the user takes his marking instrument or pencil P in one hand, and rests such hand upon the projecting portion 72. Then, he takes the other hand and inserts a digit D through the opening 38 in the bottom wall to thereby push the entire stack of cards upwardly toward the top wall. This enables him to properly mark the uppermost card in the stack through the appropriate marking apertures 34. Then, with the same hand which accomplished the marking, the ejector slide member 56 is pushed forwardly to dispense the marked card through the slot means 40. The user then removes his finger or digit D from the opening 38 and with that hand grasps the card dispensed through the slot means 40. He then permits the box to turn on its side in the manner in which the same is carried by the strap 11, thus making room to insert the marked card through the slot means 66 and onto the bottom of the stack. The recess 70 assures that the card can be fully pushed into position within the container, and this prevents the markings on the card from being smeared and also prevents the card from being bent, mangled or mutilated in any manner so that the same will not work properly in a data processing machine. The user then continues along his route and follows a similar operation at each location until the end of the day. Of course, at the end of the day, assuming that all of the cards have been utilized, the first card will again be at the top of the stack and all of the cards will be in proper order. Then, the user can merely remove the butt plate 26 and can take the entire stack of cards and store the same or introduce the same into a data processing machine, which automatically accomplishes the desired billing or other tabulating.

After reading the foregoing detailed description, it should be apparent that the objects set forth at the outset of the specification have been successfully achieved by the present invention. Accordingly:

What is claimed is:

1. A container for carrying data processing cards and for permitting marking of such carried cards, said container comprising:

a casing having spaced apart parallel top and bottom walls, end walls and side walls connected together to form an internal cavity adapted to contain a stack of data processing cards;

said top wall having a shaped portion therein forming an array of discrete marking apertures therein;

said array including a plurality of vertically and horizontally aligned marking apertures;

said bottom wall having an opening therein coaxially aligned beneath said shaped portion along an axis extending perpendicularly between said top and bottom walls to facilitate digital insertion for raising said stack of cards into contact with the underside of said top wall until the uppermost card in said stack can be marked by a marking instrument inserted through the appropriate marking aperture.

2. A container as defined in claim 1 further including first slot means at the upper end of one of said end walls and ejector means for dispensing the uppermost card in said stack through said first slot means after such card has been marked.

3. A container as defined in claim 2 wherein said ejector means includes elongated passage means in said top face and a slide member movably mounted within said passage means.

4. A container as defined in claim 3 wherein said slide member includes a portion disposed within said internal cavity, said portion having frictional engaging means thereon to assure that movement of said slide member within said passage means will cause a corresponding movement and hence a dispensing of the uppermost card in said stack.

5. A container as defined in claim 2 further including an adjustable control element movably mounted adjacent said first slot means to vary the size thereof to thus assure that only a single card will be dispensed therethrough during each operation of said ejector means.

6. A container as defined in claim 2 further including second slot means at the lower end of one of said end walls whereby a marked card from the top of said stack which has been dispensed through said first slot means can thereafter be reintroduced into said internal cavity through said second slot means to be positioned at the bottom of said stack.

7. A container as defined in claim 6 wherein said second slot means includes an enlarged recess portion which permits digital insertion of a card therethrough and completely into said internal cavity.

8. A container as defined in claim 1 wherein said top wall includes a projecting portion extending beyond one of said side walls to provide a hand rest to stabilize the operator's hand to facilitate marking through one of said marking apertures.

9. A container as defined in claim 1 wherein each of said end walls includes a strap supporting means and wherein an elongated loop strap passes through said strap supporting means to enable said container to be body carried by hanging said loop strap over a shoulder.

10. A container as defined in claim 1 wherein at least one of said end walls is slidably mounted within opposed grooves in said side walls and wherein latch means are provided to normally prevent said one end wall from sliding within said grooves.

11. A container as defined in claim 10 wherein said latch means is integral with one of said side walls.

12. A container as defined in claim 1 wherein said casing is fabricated of optically transparent material to permit visual observation of said data processing cards disposed within said internal cavity.

References Cited

UNITED STATES PATENTS

| | | | |
|---|---|---|---|
| 2,538,084 | 1/1951 | Collins | 281—44 |
| 2,653,038 | 9/1953 | Dyer | 281—44 |
| 2,701,663 | 2/1955 | Pennington | 221—213 |
| 2,707,115 | 4/1955 | Rolleston | 281—44 |
| 3,227,472 | 1/1966 | Swift | 281—44 |

STANLEY H. TOLLBERG, *Primary Examiner.*